June 1, 1937.  W. GEBHARDT ET AL  2,081,993
SMALL SYNCHRONOUS MOTOR
Filed Dec. 13, 1935

WITNESSES:
Carl N. Evans

INVENTORS
Wilhelm Gebhardt &
Siegfried Franck
BY
O.T.F. Buchanan
ATTORNEY

Patented June 1, 1937

2,081,993

UNITED STATES PATENT OFFICE 2,081,993

SMALL SYNCHRONOUS MOTOR

Wilhelm Gebhardt, Nuremberg, and Siegfried Franck, Stein, near Nuremberg, Germany, assignors to Westinghouse Electric & Manufacturing Company, East Pittsburgh, Pa., a corporation of Pennsylvania Application December 13, 1935, Serial No. 54,224
In Germany February 8, 1935

16 Claims. (Cl. 172—275)

Our invention relates to synchronous motors, and it has particular relation to small, self-starting, single-phase, synchronous motors such as are utilized for timing purposes.

In a known form of small, polarized, synchronous motor, self-starting is with difficulty obtained by inclining the poles of the polarized rotor to one side, or by rendering the rotor magnetically unsymmetrical in any other manner. However, giving the poles an exactly accurate configuration raises difficulties in quantity-production methods, and is not alone sufficient to cause the motor to start in a predetermined direction, because the motor starts in the one direction or the other according to the polarity with which the windings are connected. For this reason, such motors have been provided with devices for locking them against backward movement, or with unidirectional mechanical drives, in order to make the starting apparatus always start in the same direction of rotation.

In order to decrease the speed of the motor, the stator has been given a so-called claw-type shape, in another known form of small synchronous motor, in which toothed iron sheets are disposed on the two sides of an exciting magnet, with their teeth interlacing. The teeth constitute the stator poles, with alternate teeth of different polarity. In this manner, a stator is provided, having a comparatively large number of poles.

An object of our invention is to produce a small synchronous motor in which the magnetic dissymmetry of the poles is eliminated, thus materially simplifying the quantity-production, because it is no longer necessary to give the poles an exact configuration.

A further object of our invention is to produce a small synchronous motor in which there is no need for locking-mechanisms for preventing backward rotation, or for unidirectional mechanical drives.

According to our invention, the motor is provided with two mechanically coupled rotors, and with two series of stator poles having magnetic fluxes which are out of phase with each other.

The two stators and rotors are also spatially displaced with reference to each other in the direction of rotation, by an amount corresponding to the phase-displacement of the magnetic fluxes.

Figure 1:
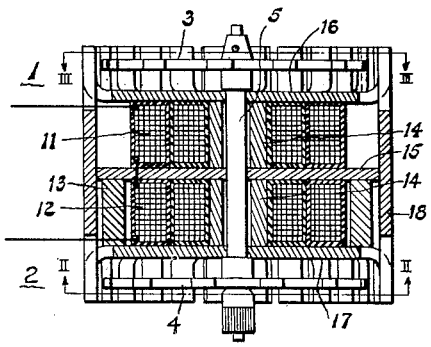
Figure 4:
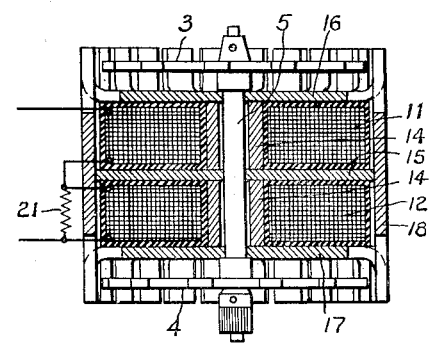
Figure 2:
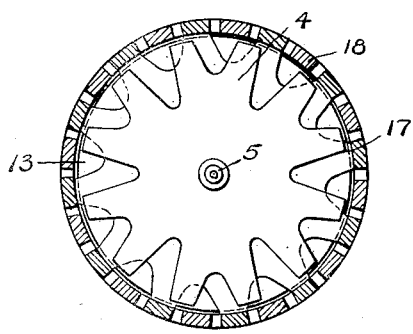
Figure 3:
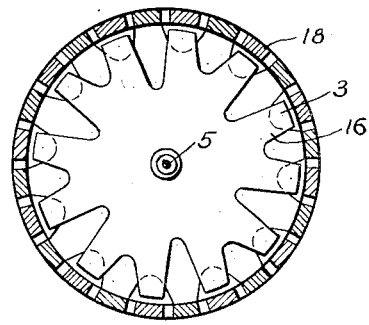
Figure 5:
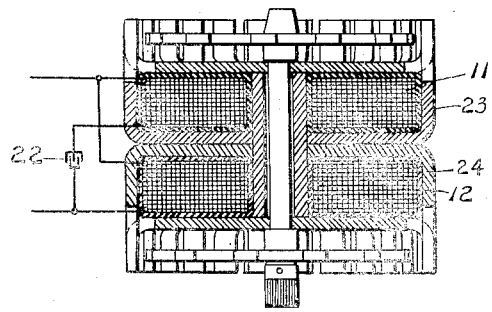

With the foregoing and other objects in view, our invention consists in the structures, combination, systems and connections hereinafter described and claimed, and illustrated in the accompanying drawing, wherein Figure 1 is a longitudinal sectional view through a preferred form of embodiment of our invention, Fig. 2 is a sectional view on the line II—II of Fig. 1, Fig. 3 is a sectional view on the line III—III of Fig. 1, Fig. 4 is a view similar to Fig. 1 showing a modification, and Fig. 5 is a similar view showing another modification.

In the embodiment of our invention shown in Figs. 1 to 3, our motor utilizes two exciting windings, or single-phase coils, 11, 12 which are illustrated as being connected in series, although a series connection is not absolutely essential. The exciting winding 12 is loaded by a short-circuited lagging means 13 which may be in the form of a ring or disk of good-conducting material disposed anywhere adjacent to the coil 12, that is, between the coil and the magnetizable materials constituting the magnetic flux-path subsequently to be described. This lag member 13 is for the purpose of causing the flux in the magnetic circuit of the coil 12 to lag in time-phase behind the flux in the magnetic circuit of the coil 11. In Fig. 1, the lagging means is shown in the form of a lag ring or shading coil 13 surrounding the coil 12.

The coils 11 and 12 are disposed around two magnetizable cores 14 which are joined end-to-end. The magnetizable cores 14 carry an intermediate magnetizable disk 15 at the core-ends which are joined together, and two toothed outer magnetizable disks 16 and 17 at the free ends of the respective cores. The intermediate disk 15 is magnetically connected to a magnetizable tube 18 which surrounds the two coils 11 and 12 and the lag ring 13. Both ends of the magnetizable tube 18 are provided with teeth which interlace with the teeth of the end-disks 16 and 17, respectively, as can be particularly seen in Figs. 2 and 3, thus comprising, with the teeth of the end-disks 16 and 17, two separate field-pole structures 1, 2. It will be noted that each field-pole structure consists of a series of stator-poles, or a plurality of pairs of poles of alternating instantaneous polarities, thus producing an alternating or non-rotating field. By reason of the loading afforded by the lag-ring 13, the flux in the field-pole structure 2 lags in phase behind the flux in the field-pole structure 1.

As shown in Figs. 1 to 3, the motor also comprises a rotor-shaft 5 which extends through the two stator cores 14. There are also two rotor armature members 3, 4, mounted on the respective ends of the shaft 5, or otherwise mechanically coupled together, and mounted so as to cooperate with the respective field-pole structures 1, 2. These rotor armature members 3, 4 are preferably comprised of toothed disks of polarized permanent-magnet steel of high coercive force, although either the toothing, or the polarizing, or the use of permanent-magnet material may be dispensed with, if the fullest advantage to be realized is not desired of my invention.

Either the two rotor-members 3, 4 or the two series of stator poles 1, 2 are spatially displaced with reference to each other, substantially in accordance with the time-phase displacement of the stator flux. The time-phase displacement and the spatial displacement of the two series of stator poles 1, 2, with respect to the two rotor-members 3, 4 insure that the motor will always start in a permanently fixed direction of rotation, and with a torque which is equalized in its variations with time. It will be noted that the angular spacing between the stator poles of the field-pole structures 1 and 2 is the same as the angular spacing between the teeth of the cooperating rotor disks 3, 4, so that there is a strong tendency for the stator flux in each of the field-pole structures to draw the associated rotor-member into predetermined positions in which the rotor teeth coincide with the stator teeth at the moment when the stator flux is a maximum. Thus, at the moment of starting the motor, first one rotor-member, and then the other, will rotate toward its predetermined angular position, causing the motor to start in a predetermined direction of rotation depending upon the direction of the aforesaid spatial displacement. In operation, the two rotor-members tend to synchronize with their respective field structures, but at different angular positions of the rotor-members. However, the field structures attain their maximum flux-strengths at different times, and hence there is a continuity of torque, as well as a material increase in the torque as compared to a motor having only one field-pole structure.

By providing our shaded and unshaded stator poles in separate rings of poles or field-pole structures, instead of having the shaded or phase-displaced poles interposed between unshaded poles, it is possible to obtain poles which are of adequate width, even in a motor having a large pole-number. This is of advantage in increasing the torque and in facilitating quantity-production.

In lieu of the flux-displacement or lagging means 13 shown in Fig. 1, the same result may be secured electrically by causing the currents in the two windings 11 and 12 to be different in phase from each other, as by means of a parallel-connected impedance 21, as shown in Fig. 4, or by means of a serially connected impedance 22, as shown in Fig. 5. In Fig. 4, the two windings 11 and 12 are in series, and in Fig. 5, they are in parallel. The impedance may be either ohmic, inductive or capacitive. In Fig. 5, it is shown as a small capacitor 22.

In order that the stator poles may be angularly displaceable or adjustable with reference to each other, and in order that the stator may be made in two juxtapositioned parts, there could be used, instead of the intermediate disk 15 and the tubular magnetizable member 18 of Fig. 1, two substantially cup-shaped magnetizable parts 23 and 24, each enclosing an exciting winding, as shown in Fig. 5.

In the process of adjustment or calibration, the starting torque may be adjusted to its maximum amount by angularly displacing one of the rotor-members 3 or 4 with respect to the other, in the embodiment shown in Fig. 1; or by adjusting the impedances 21 or 22, in the embodiment shown in Figs. 4 and 5; or by angularly displacing one of the stators 23 or 24 by a suitable amount, in the embodiment shown in Fig. 5.

A particular advantage of the invention resides in the fact that the motor is comparatively small, in spite of its large torque. The representation of the motor on the drawing is on an enlarged scale for the purpose of clearness.

While we have described our invention in several preferred embodiments, we desire it to be distinctly understood that variations may be made in the dispositions of the two field-pole structures and in the other details of construction and arrangement, without departing from the essential scope and principle of our invention. We desire, therefore, that the appended claims shall be accorded the broadest construction consistent with their language and the prior art.

We claim as our invention:

1. A synchronous motor comprising a plurality of toothed magnetizable rotor-members mechanically coupled together, means for providing a separate field-pole structure for each of a plurality of said rotor-members, and alternating-current electro-magnetic means for so magnetizing said separate field-pole structures that one of said structures has fluxes which are displaced in time-phase from the corresponding fluxes in another of said structures, the poles of said field-pole structures having such configuration and being so disposed that the teeth of the associated rotor-members will respectively synchronize therewith in operation, the construction and arrangement being such that one unit consisting of a rotor-member and its cooperating field-pole structure has its synchronizing position, in operation, spatially displaced with respect to the synchronizing position of another unit.

2. A self-starting synchronous motor for single-phase current, comprising a plurality of toothed magnetizable rotor-members mechanically coupled together, means for providing a separate field-pole structure for each of a plurality of said rotor-members and alternating-current electro-magnetic means for so magnetizing said separate field-pole structures that each of said structures has an alternating, non-rotating field-flux therein, the fluxes in one of said structures being displaced in time-phase from the corresponding fluxes in another of said structures, the poles of said field-pole structures having such configuration and being so disposed that the teeth of the associated rotor-members will be drawn toward predetermined angular positions with respect to the associated field-pole structures substantially at the moments of maximum field-pole flux, the predetermined angular positions of the rotor-members being spatially displaced, at the moment of starting, whereby first one, and then another, of said rotor-members will rotate toward its predetermined angular position, causing the motor to start in a predetermined direction of rotation depending upon the direction of said spatial displacement.

3. A self-starting synchronous motor for single-phase current, comprising a plurality of toothed magnetizable rotor-members mechanically coupled together, means for providing a separate field-pole structure for each of a plurality of said rotor-members, each of said separate field-pole structures consisting of a plurality of pairs of poles of alternating instantaneous polarities, the angular spacings of the field poles being substantially the same as the angular spacings of the teeth of the corresponding rotor members, and alternating-current electro-magnetic means for so magnetizing said separate field-pole structures that each of said structures has an alternating, non-rotating field-flux therein, the fluxes in one of said structures being displaced in time-phase from the corresponding fluxes in another of said structures.

4. The invention as defined in claim 3, characterized by each of the rotor-members comprising polarized permanent-magnet material.

5. A synchronous motor comprising a plurality of rotor-members mechanically coupled together, means for providing a separate field-pole structure for each of a plurality of said rotor-members, and alternating-current electro-magnetic means for so magnetizing said separate field-pole structures that one of said structures has fluxes which are displaced in time-phase from the corresponding fluxes in another of said structures, each of said rotor-members comprising magnet-material of high coercive force cooperating with its associated field-pole structure.

6. A self-starting synchronous motor for single-phase current, comprising a plurality of rotor-members mechanically coupled together, means for providing a separate field-pole structure for each of a plurality of said rotor-members, each of said separate field-pole structures consisting of a plurality of pairs of poles of alternating instantaneous polarities, and alternating-current electro-magnetic means for so magnetizing said separate field-pole structures that each of said structures has an alternating, non-rotating field-flux therein, the fluxes in one of said structures being displaced in time-phase from the corresponding fluxes in another of said structures, each of said rotor-members comprising magnet-material of high coercive force cooperating with its associated field-pole structure.

7. A synchronous motor comprising two magnetizable cores joined end-to-end, a single-phase coil on each of said cores, toothed magnetizable frame-means comprising disk-portions mounted at the free ends of said cores and at the joined ends of said cores, respectively, the toothed magnetizable frame-means which are associated with the opposite ends of each core having cooperatively associated teeth to provide a field-pole structure, means for causing the fluxes in the field-pole structure of one of said coils to be displaced in time-phase from the corresponding fluxes in the other field-pole structure, a rotor-shaft extending through the two cores, and a rotor armature member mounted on each end of the shaft and cooperating with the respective field-pole structures.

8. A synchronous motor comprising two magnetizable cores joined end-to-end, a single-phase coil on each of said cores, toothed magnetizable frame-means comprising disk-portions mounted at the free ends of said cores and at the joined ends of said cores, respectively, the toothed magnetizable frame-means which are associated with the opposite ends of each core having cooperatively associated teeth to provide a field-pole structure comprising alternate teeth of opposite instantaneous polarities to produce an alternating, non-rotating field, means for causing the fluxes in the field-pole structure of one of said coils to be displaced in time-phase from the corresponding fluxes in the other field-pole structure, a rotor-shaft extending through the two cores, and a toothed, magnetizable rotor armature member mounted on each end of the shaft and cooperating with the respective field-pole structures.

9. A synchronous motor comprising two magnetizable cores joined end-to-end, a single-phase coil on each of said cores, toothed magnetizable frame-means comprising disk-portions mounted at the free ends of said cores and at the joined ends of said cores, respectively, the toothed magnetizable frame-means which are associated with the opposite ends of each core having cooperatively associated teeth to provide a field-pole structure comprising alternate teeth of opposite instantaneous polarities to produce an alternating, non-rotating field, means for causing the fluxes in the field-pole structure of one of said coils to be displaced in time-phase from the corresponding fluxes in the other field-pole structure, a rotor-shaft extending through the two cores, and a rotor armature member mounted on each end of the shaft and comprising magnet-material of high coercive force cooperating with the respective field-pole structures.

10. A small, self-starting, polarized synchronous motor for single-phase current, comprising two polarized rotor-members mechanically coupled together, two series of stator-poles disposed to act on the two rotor-members respectively, and means for so exciting the two series of stator-poles that the magnetic flux in one of the series is displaced in time-phase with reference to the flux in the other series, the two series of stator-poles and rotor-members being spatially displaced with reference to each other, in the direction of rotation, by an amount substantially corresponding to the time-phase displacement of the magnetic flux.

11. A small synchronous motor according to claim 10, characterized by having claw-type stator-pole members, comprising teeth interlacing each other, each series of stator-poles having an individual exciting winding, and means associated with one of said windings for causing a phase-displacement of the magnetic flux in the associated series of stator-poles.

12. A small synchronous motor according to claim 10, characterized by having claw-type stator-pole members, comprising teeth interlacing each other, each series of stator-poles having an individual exciting winding, and means associated with one of said windings for causing a phase-displacement of the magnetic flux in the associated series of stator-poles, said flux-displacement means comprising an impedance electrically connected to said winding for shifting the phase of the current therein as compared to the current in the other winding.

13. A small synchronous motor according to claim 10, characterized by having claw-type stator-pole members, comprising teeth interlacing each other, each series of stator-poles having an individual exciting winding, and means associated with one of said windings for causing a phase-displacement of the magnetic flux in the associated series of stator-poles, said flux-displacement means comprising a short-circuited lag-member associated with said winding.

14. A small synchronous motor according to claim 10, characterized by having a stator member comprising a toothed tubular member, an intermediate disk, two toothed end-disks, and magnetic core-means connecting said disks, respectively.

15. A small synchronous motor according to claim 10, characterized by having a stator member comprising a toothed tubular member, two toothed end-disks, and magnetic core-means connecting said disks.

16. A small synchronous motor according to claim 10, characterized by having claw-type stator-pole members, comprising teeth interlacing each other, each series of stator-poles having an individual exciting winding, the two windings being connected in series, and a short-circuited lag-member associated with one of said windings.

WILHELM GEBHARDT.
SIEGFRIED FRANCK.